United States Patent
Lam et al.

(10) Patent No.: US 9,912,664 B1
(45) Date of Patent: Mar. 6, 2018

(54) MEDIA CONTENT FILTERING

(75) Inventors: Daniel D. Lam, Atlanta, GA (US);
Jayasri Devalapalli, Woodstock, GA (US); Jay P. Langa, Cumming, GA (US); Yousef Wasef Nijim, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/076,771

(22) Filed: Mar. 31, 2011

(51) Int. Cl.
*H04L 29/06* (2006.01)
*G06F 21/62* (2013.01)

(52) U.S. Cl.
CPC ............ *H04L 63/10* (2013.01); *H04L 63/102* (2013.01); *G06F 21/62* (2013.01)

(58) Field of Classification Search
CPC ..... H04L 63/10; H04L 63/102; H04L 63/104; H04L 63/105; H04L 63/108; H04L 63/12; H04L 67/26; H04L 9/3226; H04L 2209/60; H04L 63/101; G06F 21/62; G06F 21/629; H04N 21/6581; H04N 21/25875; H04N 21/47202; H04N 21/4532; H04N 21/482; H04N 21/4755; H04N 21/4751; G06Q 30/02
USPC .................................................. 726/4, 26–28
See application file for complete search history.

(56) References Cited

U.S. PATENT DOCUMENTS

| | | | |
|---|---|---|---|
| 2003/0005135 A1* | 1/2003 | Inoue et al. | 709/229 |
| 2005/0097595 A1* | 5/2005 | Lipsanen et al. | 725/25 |
| 2006/0064757 A1* | 3/2006 | Poslinski | 726/26 |
| 2007/0061413 A1* | 3/2007 | Larsen et al. | 709/217 |
| 2007/0282959 A1* | 12/2007 | Stern | 709/206 |
| 2009/0300671 A1* | 12/2009 | Scott | H04N 21/4755 725/27 |
| 2010/0100898 A1* | 4/2010 | Pfleging | H04N 7/17318 725/28 |
| 2011/0061109 A1* | 3/2011 | Austin et al. | 726/27 |
| 2011/0219229 A1* | 9/2011 | Cholas et al. | 713/168 |
| 2012/0011567 A1* | 1/2012 | Cronk et al. | 726/4 |
| 2012/0090007 A1* | 4/2012 | Xiao | H04N 5/44543 725/46 |

\* cited by examiner

*Primary Examiner* — Edward Zee
*Assistant Examiner* — Chi Nguy
(74) *Attorney, Agent, or Firm* — Merchant & Gould P.C.

(57) ABSTRACT

Allowing a subscriber of media content services or products to receive filtered content based on the current viewer's profile (i.e., age, gender, maturity, etc.) as opposed to the viewer's physical location is provided. Media content for which filtering may apply may be in the form of movies, television shows, music for listening/downloading, video games, internet browsing, and the like. Upon logging in from the endpoint device interface (television/set-top-box, desktop computer, laptop computer, smart-phone, touch computer, etc.), log-in information may be compared with predefined profiles set up by the primary account holder and filtered media content may be delivered to match the profile of the current logged in end user.

22 Claims, 6 Drawing Sheets

MEDIA CONTENT FILTERING

BACKGROUND

Providers of media content generally offer some method for filtering programming for end users of their products. For example, many cable television (CATV) providers allow for filtering control through settings applied to a television or set-top-box based on the viewer's age and/or programming content.

Typically, television content filtering is based on a physical viewing location (e.g., a specified set-top box) rather than on a specified viewer. This may be because filtering criteria may be stored on a physical device (e.g., television, set-top box, etc.), and control of the filtering may be set up by a head of a household or primary account holder using an application (e.g., a guide, account settings, etc.) on the device. Account settings may be applied to all or just specific televisions or set-top-boxes. For example, account settings for a television or set-top-box in a family room may be set to filter content deemed unsuitable for children under 14 years old, whereas account settings for a television or set-top-box in a master bedroom may not be restricted or filtered and may allow for all content to be viewable. Consequently, an unauthorized person may view media content deemed inappropriate if viewing the content from an unrestricted location. While current methods allow for content filtering, limitations of this method may be bound by physical location of a given device (e.g., television, set-top-box, etc.).

It is with respect to these and other considerations that the present invention has been made.

SUMMARY

Embodiments of the present invention provide for allowing a subscriber of media content services or products to enable content filtering based on a current viewer's profile as opposed to the viewer's physical location. A viewer's profile information (e.g., name, age, gender, etc.) and viewing restrictions/filtering criteria may be defined by a primary account holder or head of household. Profile data may be stored on a database server. When a viewer attempts to watch media content, regardless of the viewer's location, the viewer may be required to log in and enter credential information, such as a username and password. For example, a viewer may desire to watch television in a family room. In this case, the viewer may be prompted at the television screen interface to enter specific log-in information. This information may then be delivered through a distributed computing network to a database server, where profile information may be parsed to retrieve media content filtering criteria for a profile matching the entered username and password. The filtered media content pre-determined for this profile may then be delivered to the television or other end-point device during this logged-in period. If an additional viewer desires to watch television simultaneously in another room, the log-in process may be required for the additional user so that appropriate filtering criteria may be applied to the additional profile.

This method of filtering media content may be expanded to other end-point devices such as, but not limited to, desktop computers, lap-top computers, tablet computers, mobile phones, smart-phones, and the like. Other media delivery platforms where the embodiments of this invention may apply, in addition to traditional cable television, may include Internet streaming through broadband networks, digital subscriber line (DSL) networks, Wi-Fi, Satellite, and so on. The types of content filtered may not be limited to video content but may include other media types such as music, music downloads, video games, Internet data streaming, etc.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
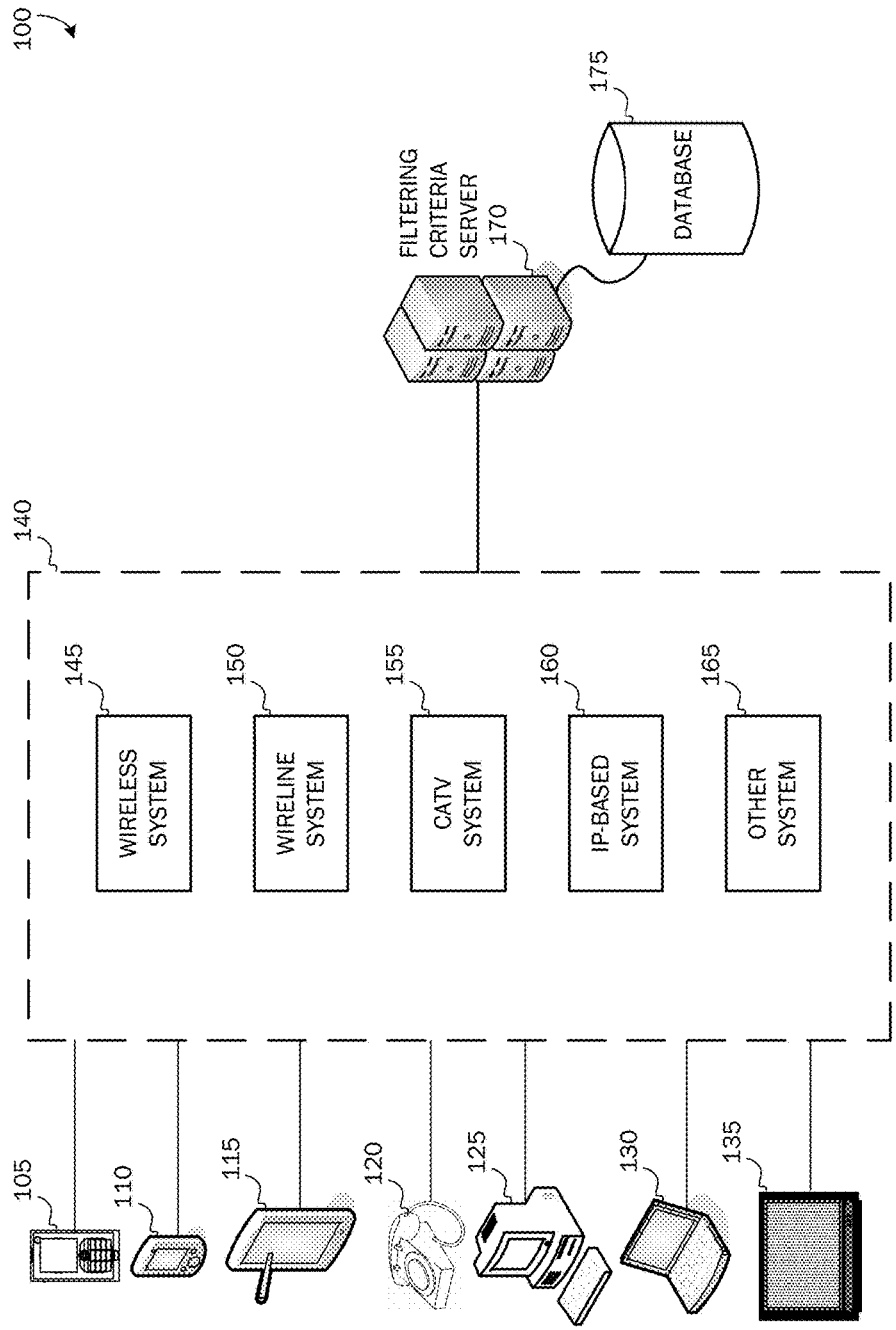
FIG. 1 is simplified block diagram illustrating a communication network architecture that serves as an exemplary operating environment for the present invention.

As briefly described above, embodiments of the present invention are directed to providing individual filtering criteria for media content regardless of a physical location of a consumer, an endpoint device with which the content is received, or a broadcasting method with which the content is delivered. The individual user may log in to the media content provider's network, provide identification information (e.g., enter a username and password), and receive the desired filtered content as predetermined by the primary account holder (e.g., head of household). Upon submitting the identifying information, the profile of the consumer may be identified in a database and the appropriate filtering criteria may be applied for the matching profile.

For example, a subscriber to a media content service may log on to an account remotely using a laptop computer and select content from a filtered list of movies and stream a movie over an Internet connection. As another example, the subscriber may use a mobile computing device such as a smart-phone to select from a filtered list of music to stream. As another example, a subscriber may use a tablet computer to select a video game from a filtered list of video games and stream the game over the internet. As another example, the filtering criteria may be used to limit the amount of time the user may access the services. For example, the subscriber may log on and play video games, but may be limited to one hour per day for playing video games. In such a case, the filter criteria applied to achieve this and any of the aforementioned examples may be determined by the primary account holder upon setting up profiles for anyone having account access.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating a communication network architecture that serves as an exemplary operating environment for the present invention. In FIG. 1, a variety of communications devices and systems are illustrated for which filtering media content may be applied according to the embodiments of the present invention. A variety of endpoint devices are illustrated including, but not limited to, wireless telephones 105, smart phones 110, tablet computers 115, wire-line telephones 120, personal computers 125, laptop computers 130, network-connected televisions (e.g., Internet televisions, televisions connected to a set-top box, etc.) 135, etc. to communicate with one or more remote applications or other endpoint devices via a communications network 140. As should be appreciated, the numerous endpoint devices illustrated in FIG. 1 may be utilized to send and/or receive communications in various operating environments according to various types of transmissions, including media content.

The network 140 is illustrative of one or more media content delivery systems through which the various endpoint devices/systems 105,110,115,120,125,130,135 may operate. For example, the wireless system 145 may be utilized for wireless voice, text and data transmissions. The wire-line system 150 may be utilized for wire-line voice, text and data transmissions. The Cable Television (CATV) system 155 may be utilized for provision of television services and data services. The IP-based system 160 may be utilized for any of a variety of Internet protocol-based services such as voice and data transmissions. Other systems 165 are illustrative of any number of other systems that may be utilized for providing communications between various endpoint devices with other endpoint devices, software applications and data repositories. In as much, a single combined system may be provided by a given service provider for providing multiple types of the aforementioned communications services, including media content. For example, a single services provider may offer television, wireless and wire-line telephone and data products or services.

Referring still to FIG. 1, a filtering criteria system 170 and associated database 175 may serve as a central computerized system for verifying, processing, and data storage according to the embodiments of this invention. The filtering criteria system 170 is illustrative of any suitable computing system (e.g., server computer), capable of sending, receiving, processing, verifying and storing data according to embodiments of the present invention. The filtering criteria system 170 may be associated with any one or combination of the communications systems illustrated in the network 140 for maintaining and processing subscriber information, including but not limited to, products or services subscribed to, contract information, subscriber contact information, product/services usage data, as well as all necessary media filtering functionality. The associated database 175 may be operative for storing information for various subscribers and subscribers' profiles.

According to embodiments, the filtering criteria server 170 and associated database 175 may be utilized for various subscribers utilizing media filtering technology and may not be limited to customers of a single media content provider company, but may be multiple media content provider companies. For example, multiple content provider companies may include companies like HBO, SHOWTIME, APPLE, NETFLIX, in addition to CATV companies, and so on. That is, embodiments of the present invention may be utilized by companies who engage in providing media content through various methods of electronic delivery and who wish to filter media content based on an individual profile rather than a physical location. As should be appreciated, these are but a few examples of the many ways a media content provider may implement filtering criteria to an end user based on predetermined profiles as established by an account holder.

According to embodiments, filtering criteria information may include age restriction information, content ratings restriction information, language content restriction information, violence content restriction information, sexual content restriction information, television channel restriction information, and/or time restriction information. For example, age restriction information may include applying a setting that a given user may not access content according to an age group category associated with the content. Content ratings restriction information may include, for example, restricting a given user from accessing content that has a rating of R or PG-13 according to content ratings, such as ESRB content ratings. Language, violence, and sexual content restriction information may include, for example, restricting a given user from accessing content that contains a given amount or type of language, violence, or sexual content according to content ratings, such as ESRB content ratings. Television channel restriction information may include restricting a given user's access to one or more specified channels, for example, to an adult entertainment channel. Time restriction information may include restricting a given user's access to content during or after a certain time of the day (e.g., after 10:00 PM, from 3:00 PM-5:00 PM), or after a specified amount of time (e.g., restricting the user's access to content after 3 hours of use).

Embodiments of the present invention may be applied to various applications including, but not limited to, media programming guide applications (e.g., television listings applications), web browser applications, gaming applications, OnDemand media streaming applications, and the like.

Figure 2:
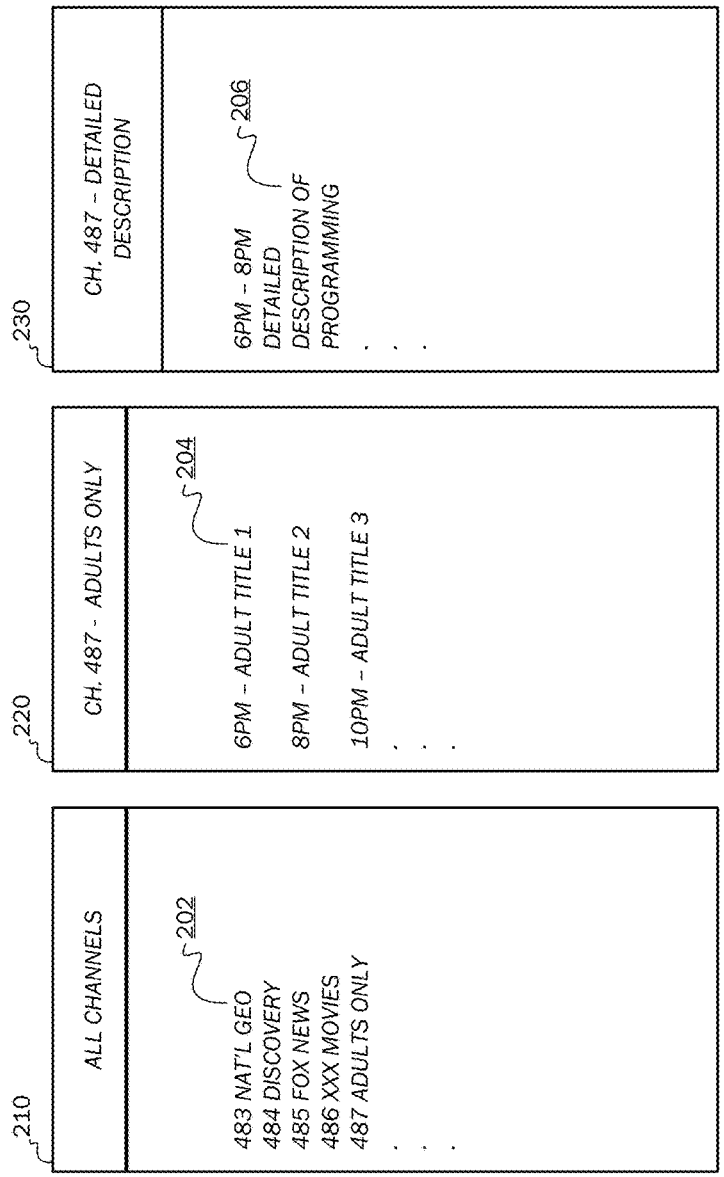
FIG. 2 is a simplified block diagram illustrating an example screenshot without embodiments of the present invention applied.

Referring now to FIG. 2, example screenshots 210, 220, 230 of an example media programming guide interface are illustrated wherein embodiments of the present invention are not applied. With embodiments of the present invention not applied, channels and titles of all available media content may be displayed to a user, including titles of adult oriented programming content. As shown in screenshot 210, available channels 202 are listed in a media programming guide interface, and may include channels that may not be suitable for younger viewers. When a channel is selected, as shown in screenshot 220, programming titles 204 may be displayed. A listing of programming titles 204 may include titles of media content that may not be suitable for younger viewers. As can be appreciated, certain programming titles 204 alone may be inappropriate for younger viewers, and may contain offensive or sexually-explicit language. As shown in screenshot 230, a media programming guide interface may include a detailed description 206 of media content. A detailed description 206 may be considered inappropriate for potential viewers when filtering methods are not employed to the media content available. Although not illustrated in FIG. 2, other content that may be considered inappropriate for potential viewers may be displayed including, but not limited to, content showcards (i.e., graphical images) and content previews (e.g., movie/video trailers). As mentioned previously, current filtering criteria technology is limited to a physical location of an endpoint device 105,110,115,120, 125,130,135 delivering the media content. Consequently, if a viewer views media provided over an endpoint device in another room or on another device where there may not be filtering criteria applied, inappropriate content may be delivered to an unintended end user.

Figure 3:
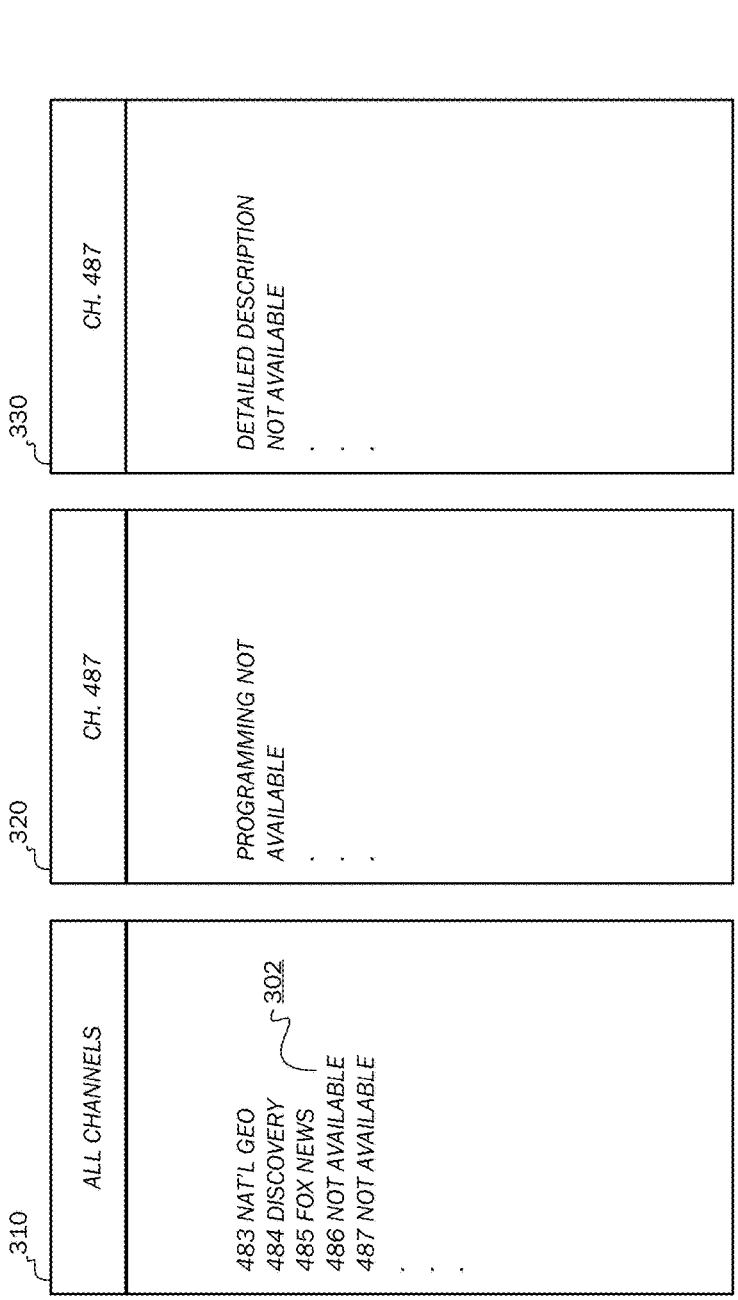
FIG. 3 is a simplified block diagram illustrating an example screenshot on a cable television system interface according to embodiments of the present invention.

Referring now to FIG. 3, example screenshots 310, 320, 330 with embodiments of the present invention applied are illustrated. The example screenshots 310, 320, 330 show potential display interfaces on a television 135, computer 125,130, tablet computer 115, smart-phone 110, or other endpoint device where media content is filtered based on an individual viewer. According to embodiments, filtering criteria information may be provided for an individual user, and may include criteria for blocking a display of certain content including, but not limited to, content titles, content descriptions, content showcards (i.e., graphical images), and content previews (e.g., movie/video trailers). For example, all illustrated in screenshot 310, titles of programs allowed to be viewed based on filtering criteria applied to a profile of a logged-in user are displayed. A user may receive a notification that access to certain content is restricted. Filtered channels may appear as "Programming Not Available" 302 as shown in this example. Screenshots 320 and 330 illustrate what may appear on the display if a filtered channel is selected by the user. As should be appreciated, this is but one example of many ways filtered media content may be presented to an end user based on predetermined profiles as established by a primary account holder. While this specific example of the invention has been described, other embodiments may exist. Although embodiments of the present invention have been described with reference to particular standards and protocols, the present invention is not limited to such standards and protocols.

Figure 4:
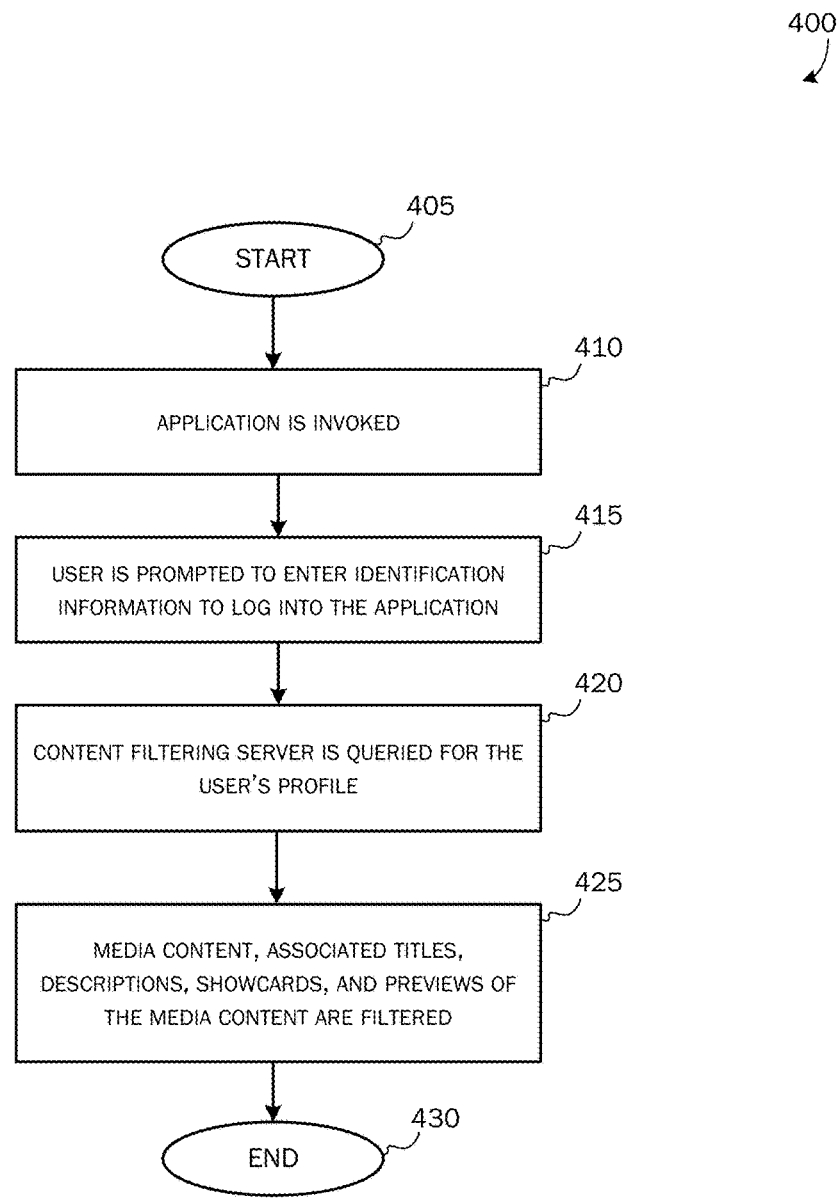
FIG. 4 is a flow diagram showing an illustrative routine for filtered media content delivery.

Referring now to FIG. 4, a process flow of a method for filtering media content is illustrated. The method 400 starts at OPERATION 405, and proceeds to OPERATION 410, where an application utilizing embodiments of the present invention is invoked. The invoked application may be one of various types of applications including, but not limited to, a media programming guide application (e.g., television listings application), a web browser application, a gaming application, an OnDemand media streaming application, etc. A user may invoke an application by starting the application (e.g., turning on a set-top box, opening a web browser application, turning on a gaming console, etc.), or by accessing the application after a given amount of time (e.g., after a time-out period).

The method 400 proceeds to OPERATION 415, where the user is prompted to enter identification information to log in to the application. For example, the user may log in from a laptop computer 130 in a remote location and provide a username and password as identification. As another example, the user may log in from a television/set-top-box interface 135, and enter required identification information. Identification information may include a user ID, a password, or other type of unique identifier. The identification information may be utilized to identify the user and to search for the user's profile. The method 400 proceeds to OPERATION 420, where the content filtering server 170 is queried for the user's profile including filtering criteria previously entered and stored for the user. The filtering criteria server 170 may compare log-in information with previously created profiles stored in a database 175.

Once the database 175 has been parsed and the profile has been determined for the logged-in end user, the method 400 proceeds to OPERATION 425, where media content, associated titles, and descriptions of the media content are filtered according to the filtering criteria predefined for the user. Filtering media content may include, but is not limited to, not displaying certain channels 202, websites, games, etc., not displaying titles 204, descriptions 206, showcards (i.e., graphical images), or content previews (e.g., movie/video trailers) of certain types of media content, not displaying descriptions 206 of certain types of media content, and disabling playing of or playback of certain content.

As an example, a child may come home from school unsupervised and desire to watch television. The child may choose to watch television in the parent's bedroom. After logging in, (i.e., providing the information requested on the log-in interface screen), the child may receive filtered media content based on restrictions defined by the primary account holder or head of household or other authorized person. Filtering criteria may be applied, for example, to allow the child access to content deemed appropriate for children under the age of 14. Or, if the child is a college student, the content may be less restrictive. Another example may be provisioned for allowing a viewer to receive filtered content for a limited amount of time (e.g., for one hour during the times between 3 pm and 6 pm). Another example may include filtering content in a place of business when an employee may log in from a desktop computer 125 and only have limited or filtered access to certain Internet sites and other information. For another example, music listening options or music downloading options from a smart-phone 110, MP3 player, tablet computer 115, laptop 130, and the like, may be filtered appropriately to an end user profile. At the termination of the viewing time, for example, logging off, turning off the media receiving device, or failing to interact in some way with the media content provider for a given amount of time, the filtering criteria server 170, may be reset and require the log-in procedure 415 to be repeated. The process of verification of profile information and providing filtered media content may be repeated as well. As mentioned previously, this may occur through any number of endpoint devices, over various communication systems, and for a multitude of content providers. The routine 400 ends at OPERATION 430.

Figure 5:
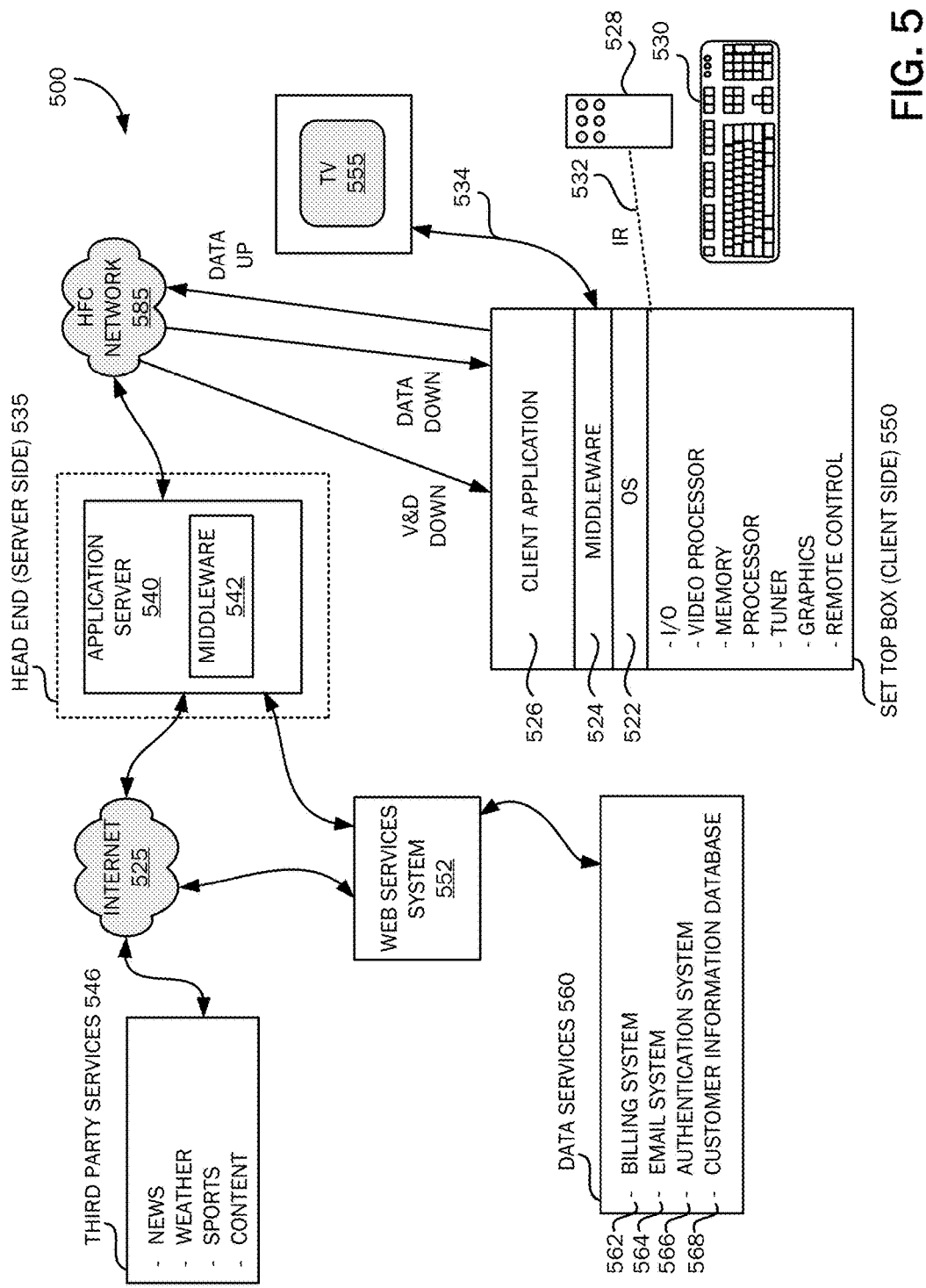
FIG. 5 is a simplified block diagram illustrating a cable television/services system architecture that serves as an exemplary operating environment for the present invention.

FIG. 5 illustrates a cable television/services system (hereafter referred to as "CATV") architecture 500 that serves as an exemplary operating environment for embodiments of the invention. In FIG. 5, digital and analog video programming, information content and interactive television services are provided via a hybrid fiber coax (HFC) network 585 to a television set 555 for consumption by a cable television/services system customer. As is known to those skilled in the art, HFC networks 585 combine both optical fiber and coaxial cable lines. Typically, optical fiber runs from the cable head end 535 to neighborhoods of 500 to 2,000 customers. Coaxial cable runs from the optical fiber feeders to each customer. According to embodiments of the present invention, the functionality of the HFC network 585 allows for efficient bidirectional data flow between the client-side set-top box 550 and the server-side application server 540 of the present invention.

According to embodiments of the present invention, the CATV system 500 is in the form of a distributed client-server computing system for providing video and data flow across the HFC network 585 between server-side services providers (e.g., cable television/services providers) via a server-side (backend) head end 535 and a client-side customer via a client-side set-top box (STB) functionally connected to a customer receiving device, such as the television set 555. As is understood by those skilled in the art, modern CATV systems 500 may provide a variety of services across the HFC network 585 including traditional digital and analog video programming, telephone services, high speed Internet access, video-on-demand, and information services.

On the client side of the CATV system 500, digital and analog video programming and digital and analog data are provided to the customer television set 555 via the set-top box (STB) 550. Interactive television services that allow a customer to input data to the CATV system 500 likewise are provided by the STB 550. As illustrated in FIG. 5, the STB 550 is a multipurpose computing device having a computer processor, memory and an input/output mechanism. The input/output mechanism of a STB 550 receives input from server-side processes via the HFC network 585 and from customers via input devices such as the remote control device 528 and the keyboard 530. The remote control device 528 and the keyboard 530 may communicate with the STB 550 via a suitable communication transport such as the infrared connection 532. The STB 550 also includes a video processor for processing and providing digital and analog video signaling to the television set 555 via a cable communication transport 534. A multi-channel tuner is provided for processing video and data to and from the STB 550 and the server-side head end system 535, described below.

The STB 550 also includes an operating system 522 for directing the functions of the STB 550 in conjunction with a variety of client applications 526. For example, if a client application 526 requires a news flash from a third-party news source to be displayed on the television 555, the operating system 522 may cause the graphics functionality and video processor of the STB 550, for example, to output the news flash to the television 555 at the direction of the client application 526 responsible for displaying news items.

Because a variety of different operating systems 522 may be utilized by a variety of different brands and types of set-top boxes, a middleware layer 524 is provided to allow a given software application to be executed by a variety of different operating systems. According to an embodiment of the present invention, the middleware layer 524 may include a set of application programming interfaces (API) that are exposed to client applications 526 and operating systems 522 that allow the client applications to communicate with the operating systems through common data calls understood via the API set. As described below, a corresponding middleware layer is included on the server side of the CATV system 500 for facilitating communication between the server-side application server and the client-side STB 550. According to one embodiment of the present invention, the middleware layer 542 of the server-side application server and the middleware layer 524 of the client-side STB 550 format data passed between the client side and server side according to the Extensible Markup Language (XML). As should be appreciated by those skilled in the art, although some embodiments described in this specification are oriented to middleware installed and executed on a STB 550, alternative embodiments implemented as firmware or as hardware are well within the scope of the present invention.

The set-top box 550 passes digital and analog video and data signaling to the television 555 via a one-way communication transport 534. The STB 550 may receive video and data from the server side of the CATV system 500 via the HFC network 585 through a video/data downlink and data via a data downlink. The STB 550 may transmit data from the client side of the CATV system 500 to the server side of the CATV system 500 via the HFC network 585 via one data uplink. The video/data downlink is an "in band" downlink that allows for digital and analog video and data signaling from the server side of the CATV system 500 through the HFC network 585 to the set-top box 550 for use by the STB 550 and for distribution to the television set 555. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 5, between the HFC network 585 and the set-top box 550 comprise "out of band" data links. As is understand by those skilled in the art, the "out of band" frequency range generally lies between zero and 54 megahertz. According to embodiments of the present invention, data flow between the client-side set-top box 550 and the server-side application server 540 is typically passed through the "out of band" data links. Alternatively, an "in band" data carousel may be positioned in an "in band" channel into which a data feed may be processed from the server-side application server 540 through the HFC network 585 to the client-side STB 550. Operation of data transport between components of the CATV system 500, described with reference to FIG. 5, is well known to those skilled in the art.

Referring still to FIG. 5, the head end 535 of the CATV system 500 is positioned on the server side of the CATV system and includes hardware and software systems responsible for originating and managing content for distributing through the HFC network 585 to client-side STBs 550 for presentation to customers via televisions 555. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 550 via the HFC network 585. As described above with reference to the set-top box 550, the application server 540 includes a middleware layer 542 for processing and preparing data from the head end of the CATV system 500 for receipt and use by the client-side set-top box 550. For example, the application server 540 via the middleware layer 542 may obtain data from third-party services 540 via the Internet 525 for transmitting to a customer through the HFC network 585 and the set-top box 550. For example, a weather report from a third-party weather service may be downloaded by the application server via the Internet 525. When the application server 540 receives the downloaded weather report, the middleware layer 542 may be utilized to format the weather report for receipt and use by the set-top box 550. According to one embodiment of the present invention, data obtained and managed by the middleware layer 542 of the application server 540 is formatted according to the Extensible Markup Language and is passed to the set-top box 550 through the HFC network 585 where the XML-formatted data may be utilized by a client application 526 in concert with the middleware layer 524, as described above. As should be appreciated by those skilled in the art, a variety of third-party services data, including news data, weather data, sports data and other information content, may be obtained by the application server 540 via distributed computing environments such as the Internet 525 for provision to customers via the HFC network 585 and the set-top box 550. According to an embodiment of the present invention, digital video recording functionality may be located remotely on the head end (server side) 535 and called upon by a client set-top box 550.

According to embodiments of the present invention, the application server 540 obtains customer profile data from services provider data services 560 for preparing a customer profile that may be utilized by the set-top box 550 for tailoring certain content provided to the customer and for pre-populating product/services order forms and customer lead generation forms. As illustrated in FIG. 5, the services provider data services 560 include a number of services operated by the services provider of the CATV system 500 which may include data on a given customer. For example, a billing system 562 may include information such as a customer's name, street address, business identification number, Social Security number, credit history, and information regarding services and products subscribed to by the customer. An electronic mail system 564 may contain information such as electronic mail addresses, high-speed Internet access subscription information and electronic mail usage data. An authentication system 566 may include information such as secure user names and passwords utilized by customers for access to network services.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

As should be understood by those skilled in the art, the disparate data services systems 562, 564, 566, 568 are illustrated as a collection of data services for purposes of example only. The example data services systems comprising the data services 560 may operate as separate data services systems, which communicate with a web services system (described below) along a number of different communication paths and according to a number of different communication protocols Referring still to FIG. 5, a web services system 552 is illustrated between the application server 540 and the data services 560. According to embodiments of the present invention, the web services system 552 serves as a collection point for data requested from each of the disparate data services systems comprising the data services 560. When the application server 540 requires customer profile data from one or more of the data services 560 for preparation or update of a customer profile, the application server 540 passes a data query to the web services system 552. The web services system formulates a data query to each of the available data services systems for obtaining any available data for a given customer as identified by a set-top box identification associated with the customer. The web services system 552 serves as an abstraction layer between the various data services systems and the application server 540. That is, the application server 540 is not required to communicate with the disparate data services systems, nor is the application server 540 required to understand the data structures or data types utilized by the disparate data services systems. The web services system 552 is operative to communicate with each of the disparate data services systems for obtaining necessary customer profile data. The customer profile data obtained by the web services system is assembled and is returned to the application server 540 for ultimate processing via the middleware layer 542, as described above.

Figure 6:
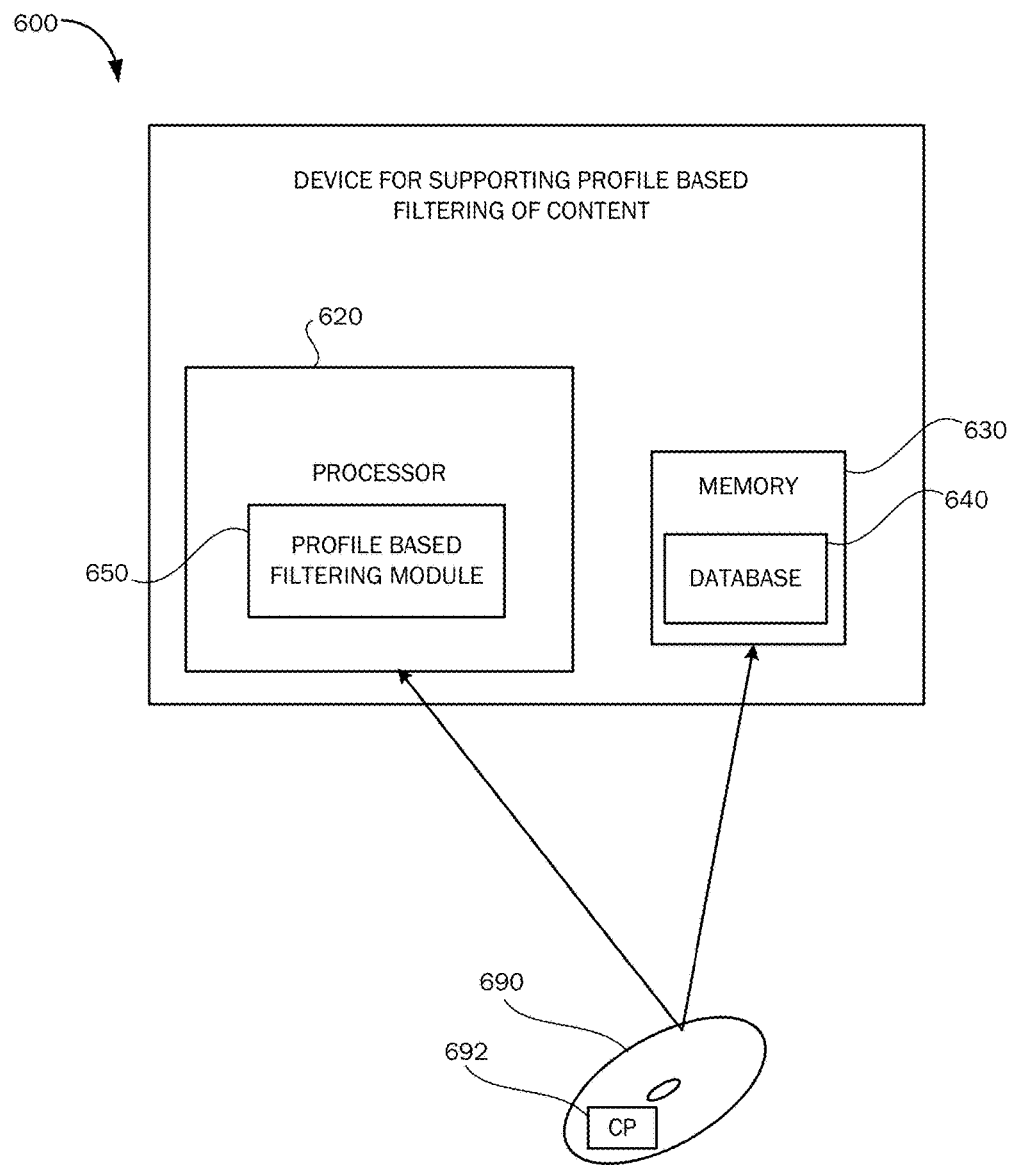
FIG. 6 illustrates a suitable computing environment for implementing profile based filtering of content.

FIG. 6 illustrates a suitable computing environment 600 for implementing a method of filtering media content as described above in FIGS. 1-5 according to an embodiment. In FIG. 6, a device for supporting profile based filtering of media content 600 includes a processor 620 and memory 630. Those skilled in the art will recognize that the device for supporting profile based filtering of media content 600 may be a personal device of a user, a server such as a DVR, a STB or other terminal equipment or a system provider system. Embodiments may also be implemented in combination with other types of computer systems and program modules. Generally, program modules include routines, programs, components, data structures, and other types of structures that perform particular tasks or implement particular abstract data types.

According to embodiments, computer-readable media 690 include communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information 692. Such information can include data structures, program modules, computer-executable instructions, or other data.

Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that computer-readable media can be any available media that can be accessed or utilized by a processing device, e.g., personal media device, cellphone, server or communications network provider infrastructure.

By way of further example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 630 thus may store the computer-executable instructions that, when executed by processor 620, cause the processor 620 to implement a device for supporting profile based filtering of content 600 as illustrated above in FIGS. 1-5 according to an embodiment of the invention. A database 640 may be maintained in memory 630 to provide access to data maintained in memory 630. Profile based filtering module 650 may also be configured to support functions involved in providing profile based filtering of content.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for filtering content, comprising:
subscribing to media content services for providing media content to one or more endpoint devices over various communication systems;
receiving a request from a user at an endpoint device to create and store a profile for another user of the one or more endpoint devices;
providing content filtering criteria information, by the user creating the profile, associated with the profile of the other user;
receiving over one of the communication systems a request from the other user to access an application via another endpoint device;
requesting log-in information from the other user via the other endpoint device;
receiving over one of the communication systems log-in information for the other user;
querying a database for the profile of the other user associated with the received log-in information including the content filtering criteria information provided by the user that created the profile on the endpoint device;
if the database includes the profile for the other user associated with the received log-in information, including the content filtering criteria information provided by the user that created the profile on the endpoint device, applying the content filtering criteria information to the media content services via the other endpoint device; and
in response to applying the content filtering criteria information associated with the other user, blocking of restricted content from being available over multiple communication systems via the application on the other endpoint device.

2. The method of claim 1, wherein receiving a request to access content includes receiving a request to access content via one of a television listings application, a web browser application, a gaming application, or a video-on-demand media streaming application.

3. The method of claim 1, wherein receiving a request to create and store the profile for the other user, wherein the profile includes filtering criteria information for the other user includes receiving an input of filtering criteria information including one or more of age restriction information, content ratings restriction information, language content restriction information, violence content restriction information, sexual content restriction information, television channel restriction information, or time restriction information.

4. The method of claim 1, further comprising displaying a notification that requested content is not available or is restricted.

5. The method of claim 1, wherein applying the content filtering criteria information to requested media content includes determining a rating of requested content.

6. The method of claim 1, further comprising receiving a request to access content via a network-connected endpoint device.

7. The method of claim 6, wherein receiving a request to access content via the network-connected endpoint device includes receiving a request to access content via one of a wireless telephone, a smart phone, a tablet computer, a wire-line telephone, a personal computer, a laptop computer, a set-top box, or a network-connected television.

8. The method of claim 1, wherein blocking the listing of restricted content from the application includes blocking one or more of: content titles, content descriptions, content images, and content previews.

9. The method of claim 1 wherein blocking display of restricted content from being available over multiple communication systems via the application comprises blocking display of restricted content from being available over multiple communication systems via a programming guide interface.

10. A system for filtering content, comprising:
a network for providing media content services subscribed to for providing media content to one or more endpoint devices over various communication systems;
a filtering criteria server, associated with the various communication systems, operable to:
receive over one of the communication systems a request from a user at an endpoint device to create and store a profile for another user of the one or more endpoint devices;
receive content filtering information from the user creating the profile for the other user;
receive over one of the communication systems a request from the other user to access an application via another endpoint device;
request log-in information from the other user via the other endpoint device;
receive over one of the communication systems log-in information for the other user;

query a database of the filtering criteria server for the profile of the other user associated with the received log-in information including the content filtering criteria information provided by the user that created the profile on the endpoint device;

if the database includes the profile for the other user associated with the received log-in information including the content filtering criteria information provided by the user that created the profile on the endpoint device, apply the content filtering criteria information to the media content services via the other endpoint device; and in response to applying the content filtering criteria information associated with the other user, blocking display of restricted content from being available over multiple communication systems via the application on the other endpoint device including one or more of: content titles, content descriptions, content images, and content previews;

the database operable to store the profile for the other user, wherein the profile includes the content filtering criteria information for the other user; and wherein at least one of the one or more endpoint devices is operable to:

send a request to access the application;

receive a request to enter log-in information from the other user;

send log-in information entered by the other user;

send a request to access media content via the application; and display requested media content.

11. The system of claim 10, wherein the application includes one of a television listings application, a web browser application, a gaming application, or a video-on-demand media streaming application.

12. The system of claim 10, wherein the filtering criteria information for the other user includes one or more of age restriction information, content ratings restriction information, language content restriction information, violence content restriction information, sexual content restriction information, television channel restriction information, or time restriction information.

13. The system of claim 10, wherein applying the filtering criteria information to requested content includes determining a rating of requested content.

14. The system of claim 10, wherein the endpoint device includes one of a wireless telephone, a smart phone, a tablet computer, a wire-line telephone, a personal computer, a laptop computer, a set-top box, or a television.

15. A computer-readable storage device which stores a set of instructions which when executed performs a method for filtering content, the method executed by the set of instructions comprising:

subscribing to media content services for providing media content to endpoint devices over various communication systems;

receiving a request from a user at an endpoint device to create and store a profile for another user;

providing content filtering criteria information, by the user creating the profile, associated with the profile of the other user;

receiving over one of communication systems a request from the other user to access an application via another endpoint device, wherein the other endpoint device includes one of a wireless telephone, a smart phone, a tablet computer, a wire-line telephone, a personal computer, a laptop computer, a set-top box, or a network-connected television;

requesting log-in information from the other user via the other endpoint device;

receiving over one of the communication systems log-in information for the other user;

querying a database for the profile of the other user associated with the received log-in information including the content filtering criteria information provided by the user that created the profile on the endpoint device;

if the database includes the profile of the other user associated with the received log-in information including the content filtering criteria information provided by the user that created the profile on the endpoint device, applying the content filtering criteria information to the media content services via the other endpoint device; and in response to applying the content filtering criteria information associated with the other user, blocking display of restricted content from being available over multiple communication systems via the application on the other endpoint device including one or more of: content titles, content descriptions, content images, and content previews.

16. The computer-readable storage device of claim 15, wherein receiving a request to access content includes receiving a request to access content via one of a television listings application, a web browser application, a gaming application, or a video-on-demand media streaming application.

17. The computer-readable storage device of claim 15, wherein receiving a request to create and store the profile for the other user, wherein the profile includes filtering criteria information for the other user includes receiving an input of filtering criteria information including one or more of age restriction information, content ratings restriction information, language content restriction information, violence content restriction information, sexual content restriction information, television channel restriction information, or time restriction information.

18. The computer-readable storage device of claim 15, further comprising:

determining a rating of requested content.

19. The computer-readable storage device of claim 15, further comprising receiving a request to create and store the profile for the other user, wherein the profile includes filtering criteria information for the other user includes receiving an input of filtering criteria information including one or more of age restriction information, content ratings restriction information, language content restriction information, violence content restriction information, sexual content restriction information, television channel restriction information, or time restriction information.

20. The computer-readable storage device of claim 15, wherein the endpoint device operable to:

send a request to access the application;

receive a request to enter log-in information from the other user;

send log-in information entered by the other user;

send a request to access content via the application; and display requested content.

21. The computer-readable storage device of claim 15, further comprising displaying a notification that requested content is not available or is restricted.

22. The computer-readable storage device of claim 15, further comprising receiving a request to access content via a network-connected endpoint device.

* * * * *